HERBERT E. TRACY,
INVENTOR.

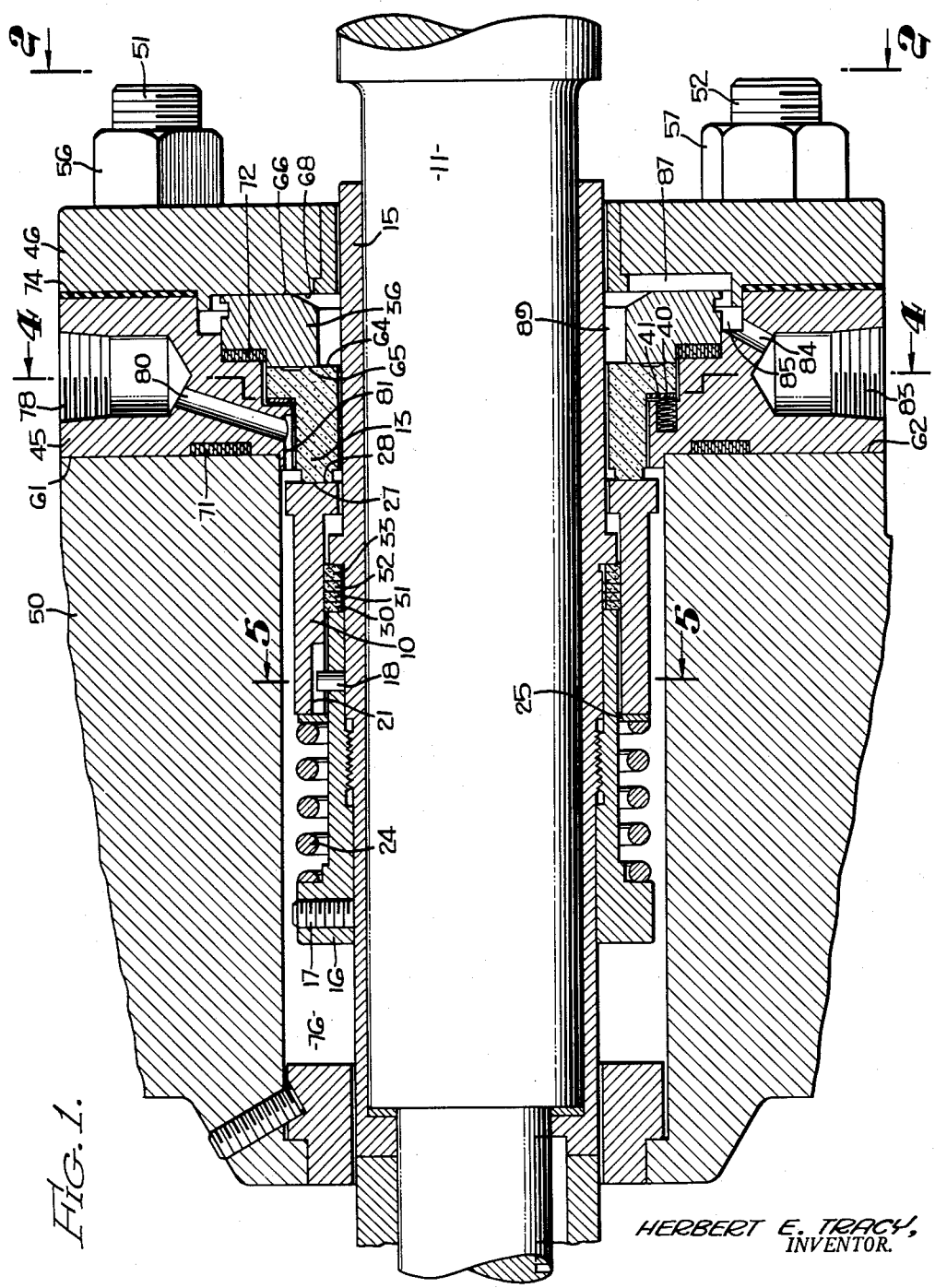

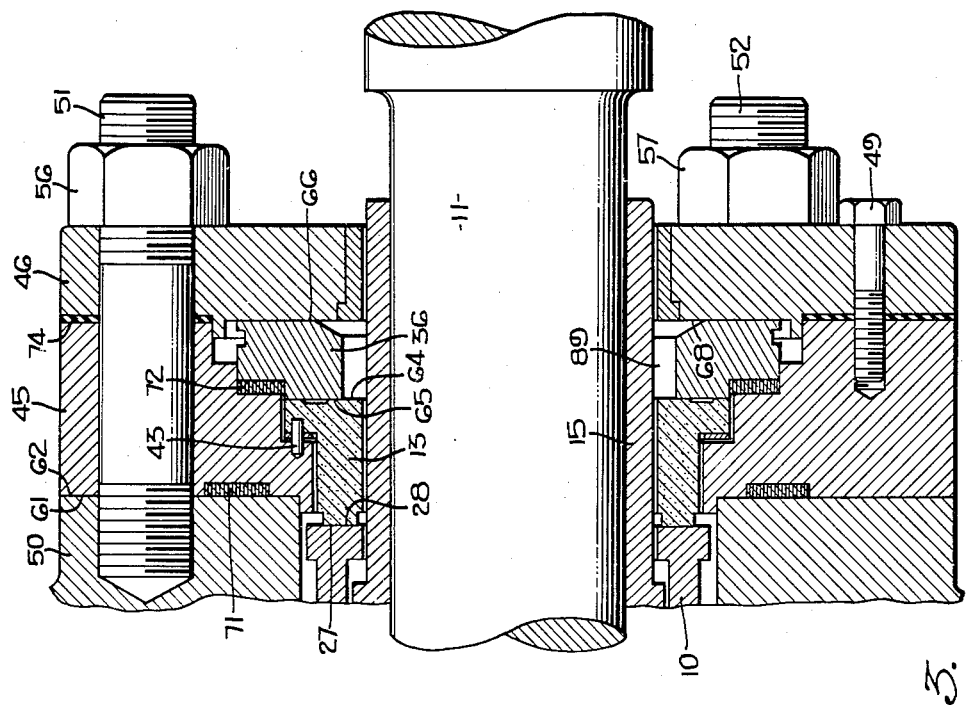
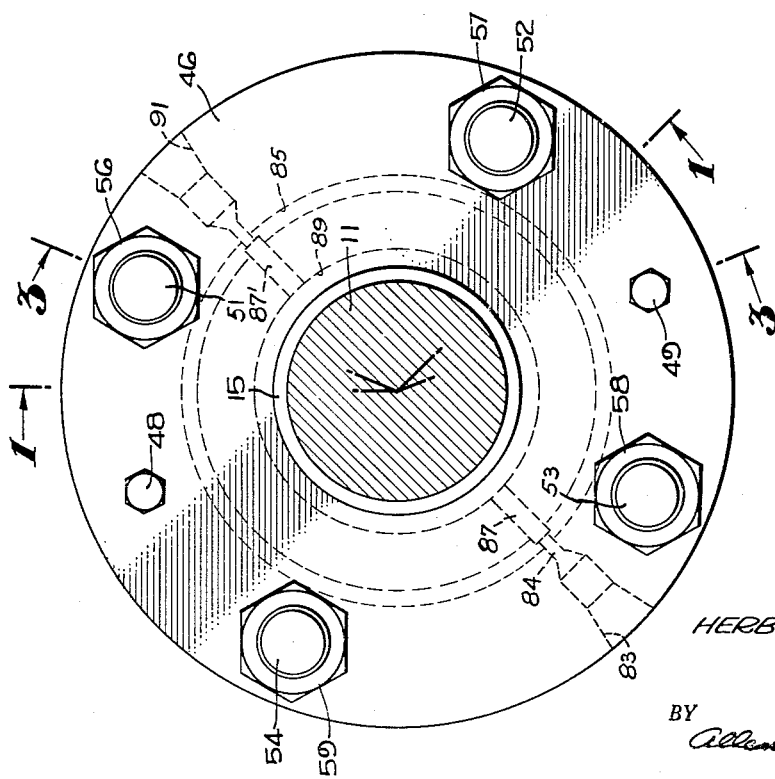
Fig. 3.
Fig. 2.
HERBERT E. TRACY,
INVENTOR.
BY
Allen E. Hambly
ATTORNEY

BY Allen E. Hambly
ATTORNEY

United States Patent Office 2,971,784
Patented Feb. 14, 1961

2,971,784
SEAL ASSEMBLY

Herbert E. Tracy, Alhambra, Calif., assignor to Borg-Warner Corporation, Chicago, Ill., a corporation of Illinois Filed Oct. 4, 1955, Ser. No. 538,317

6 Claims. (Cl. 286—9)

The present invention relates to a seal assembly especially adapted for use at high temperatures. It is of the type commonly referred to as a mechanical seal.

Mechanical seals are frequently used to prevent escape of fluid from between a rotating pump shaft and its pump case. One form of this type of seal comprises an element rotatable with the shaft, and which has a seal face which coacts with a complementary seal face on a stationary member. The rotating member is usually spring pressed against the stationary member. Mechanical seals possess the advantage that adjustment is possible between the two seal members to accommodate shifts in position of the shaft, as well as ordinary wear of the seal faces.

In order that the rotating member may move axially with respect to the shaft but yet maintain the seal, means must be provided to prevent fluid flow between the rotating member and the shaft. At temperatures below 300° F. conventional seal gaskets can be used for this purpose. Between 300° and 400° F. modern synthetic and compounds such as Teflon can be used safely. Between 400° and 500° F. asbestos may be used. Above these temperatures a change in methods and materials must be resorted to. A satisfactory arrangement for this purpose is disclosed and claimed in the co-pending application of Roland W. Ball, Serial No. 481,548 filed January 13, 1955 and now abandoned, for Improved Packing Means.

In an analogous manner it will be seen that a special mounting and sealing arrangement for the stationary seal member is necessary to prevent leakage of fluid around such member. Ordinary gasketing has not proven satisfactory when pumping fluids at elevated temperatures. The present invention is concerned with a mechanical arrangement effective to seal the stationary seal member when pumping very high temperature fluids. In addition, a back flow injection path is provided so that if the fluid being pumped contains abrasive which will tend to scour the seal parts, a counter flow can be initiated. Still further, taps are provided for water quenching. This helps prevent leakage, as well as flashing of any hot liquid that might leak past the seal, and it also cools the seal parts.

In the seal configuration illustrated, the stationary seal member has a front face that is lapped to make sealing contact with the rotating seal member, and it also has a back face lapped to a mirror finish. This back face is pressed tightly against a lapped face of a backing ring. The stationary seal member and backing ring are carried within a housing flange which abuts the end of the pump case or other housing being sealed. An end plate is fastened to the housing flange, and the assembly is affixed to the end of the pump case by bolts which pass completely through the end plate and housing flange into the pump case.

Primarily the seal is maintained by means of the snug fit of the various lapped surfaces; however gaskets are used as auxiliary seal means. These gaskets, which are preferably made of stainless steel and asbestos wrapped in a spiral, are carried so as not to be in immediate contact with the hot fluid being pumped. Thus a gasket is carried between the housing flange and the end of the pump case, and another similar gasket is squeezed between the backing ring and the housing flange. A thin fibre gasket is also carried between the end plate and the housing flange, to seal against any fluid that may have leaked between the lapped surfaces of the backing ring and end plate.

An injection tap is drilled into the housing flange, and a channel therefrom into the seal chamber is provided so that a back flow can be initiated to counter the pumped liquid if it should contain harmful abrasives.

Two other taps are drilled into the housing flange. They are in communication with a cooling chamber in back of the fixed seal member. Water may be circulated from one tap, through this chamber, and out the other tap. This cools the seal, and also prevents flashing of the pump fluid if some should leak past the seal faces.

Accordingly it will be seen that a primary object of this invention is to provide a seal assembly effective at temperatures in excess of 500° F.

It is another object of the invention to provide a seal assembly wherein the seal is maintained primarily by juxtaposition of high-finish surfaces rather than by packing materials.

It is a further object to provide an assembly for a mechanical seal wherein seal faces having high finishes are pressed tightly together to maintain the seal, and special high temperature gaskets are used to augment the sealing action.

It is a further object to provide a sealing assembly wherein seal faces having high finishes are pressed tightly together to maintain the seal, and wherein a back flow path is provided to prevent entry of fluid into the seal if it contains abrasives or other harmful ingredients.

It is a still further object of the invention to provide a seal wherein seal faces having high finishes are pressed tightly together to maintain the seal, and wherein a coolant being circulated is effective to hold temperatures down, to help seal leakage, and to prevent flashing.

Turning now to the drawings:

Figure 1 is a longitudinal sectional view of the seal taken along the line 1—1 in Figure 2.

Figure 2 is an end view of the seal as viewed along the line 2—2 of Figure 1.

Figure 3 is a longitudinal sectional view of the seal similar to that of Figure 1, except that it is taken along the line 3—3 of Figure 2.

Figure 4:
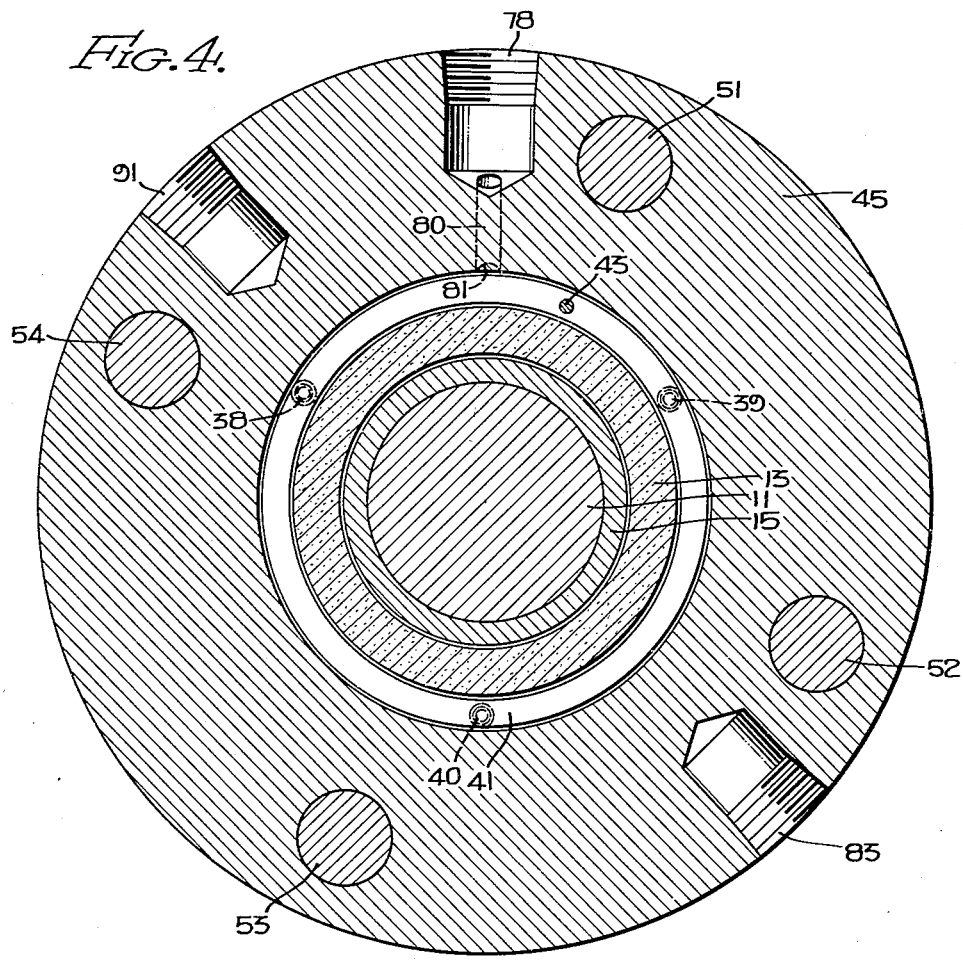
Figure 4 is a transverse sectional view taken along the line 4—4 of Figure 1.

In the drawings, the mechanical seal is illustrated as comprising a rotating seal member 10, which rotates with pump shaft 11, and a fixed member 13. Preferably member 10 is metallic and member 13 is made of carbon.

Figure 5:
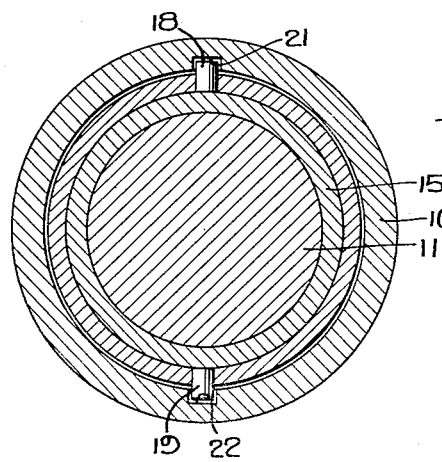
Figure 5 is a transverse sectional view taken along the line 5—5 of Figure 1.

Sleeve 15 is fastened to the shaft 11. Spring holder 16 is screw threaded onto sleeve 15 and is set by screw 17. Drive pins 18 and 19 (see Figure 5) which extend through the body wall of spring holder 16, are engaged by the longitudinal slots 21 and 22 of member 10. Because of this connection the member 10 is rotated with the shaft 11.

Spring 24 is coiled around holder 16 and presses ring 25 against member 10. This is effective to maintain the seal between members 10 and 13 at their respective seal faces 27 and 28.

In order that seal member 10 can adjust to minor changes in shaft position, and/or compensate for normal wear of faces 27 and 28, while still maintaining the seal, rings 30, 31, 32, and 33 are provided. Their action is described and claimed in the Roland Ball patent application identified above, and hence further description herein is deemed unnecessary.

The stationary seal member 13 is pressed toward backing ring 36 by means of the three coil springs 38, 39, 40 working against bearing ring 41 (see Figures 1 and 4). Pin 43, which anchors member 13 to housing flange 45, prevents rotation of member 13.

Backing ring 36 is pressed against seal member 13 by means of abutting pressure exerted by end plate 46, which is fastened to housing flange 45 by cap screws 48 and 49 and is accordingly effectively an integral part of housing flange 45. The entire seal assembly is fastened to pump case 50 by means of the bolts 51, 52, 53, and 54 and nuts 56, 57, 58, and 59.

The faces 27 and 28 of seal members 10 and 13 respectively are lapped to a high finish. Similarly faces 61 and 62 of the pump case 50 and the housing flange 45 respectively are lapped to insure very close sealing contact. Also lapped are the end face 64 of seal member 13, the faces 65 and 66 of backing ring 36, and the face 68 of the end plate 46. Consequently when the assembly is bolted together tightly, practically no fluid loss occurs at the end faces of the various members. Moreover, because of the symmetrical configuration of the sealing elements 10 and 13, the back-up ring 36 and the end plate 46, these parts will expand uniformly when subjected to heat, with the result that the sealing action is not impaired. Since the back-up ring 36 is separated from the housing flange 45 by the gasket 72 which is somewhat resilient, the irregular expansion of the housing flange, resulting from its asymmetrical distribution of material caused by the various ports 80 and 84 and taps 75 and 78, will not adversely affect the sealing action. This construction therefore avoids the use of packing means in direct contact with high temperature fluids.

If some fluid should pass the lapped surfaces it will be sealed off by the seal gaskets 71 and 72 and the seal disk 74. The gaskets 71 and 72 are formed of a strip of thin stainless steel on the bottom of a strip of asbestos wound in a tight spiral. The disk 74 may be formed of thin sheet stock.

It will be seen that normally the seal chamber 76 will be filled with the hot liquid being pumped. Should this liquid contain abrasive particles, the possibility exists that the seal faces 27 and 28 would quickly become pitted. In order to prevent this, a back flow of suitable liquid can be initiated through the tap 78. The tap 78 is in direct communication with the seal chamber 76 by means of the duct 80 and the annular passage 81. If no back flow is necessary, the tap 78 can of course be plugged.

In order to provide a cooling effect for the seal, and to provide a back pressure which will help prevent leakage, and also to prevent flashing of the liquid being pumped, quench water is circulated from tap 83, through duct 84, around annular groove 85, through passage 87, into chamber 89, and then out through tap 91 (see Figures 1 and 4). Referring to Fig. 2 it will be seen that a groove 87' forming a passage diametrically opposed to and similar to passage 87 in the inner face of end plate 46 is provided for the discharge of quenching fluid from the annulus 89 through the passage 87' and thence through tapped outlet 91.

It will be noted that the seal disclosed is a unique structural arrangement, especially designed to operate at high temperatures and to avoid the use of packing means for primary sealing. The seal is maintained primarily by the close fit of the various lapped surfaces. Gaskets are provided by way of insuring additional sealing action. A back flow path through the seal is included to oppose the flow of the pump liquid if it contains abrasive particles. Also a quench circuit is provided so that quench water can act to cool, prevent leakage, and to prevent flashing.

It is obvious that various changes may be made in the arrangement and construction of the parts without departing from the spirit of the invention or the scope of the following claims.

What I claim is:

1. A seal assembly for a rotatable pump shaft, comprising a pump casing having a seal chamber, an annular housing flange abutting the pump casing, a rigid end plate abutting the housing flange, means securing the housing flange and end plate on said pump casing, sealing gaskets between said casing and said housing flange and between said housing flange and said end plate, a rotatable pump shaft passing from said chamber through an aperture in said end plate, and mechanical sealing means for preventing the flow of fluid along the pump shaft and out of the seal chamber, said mechanical sealing means including relatively rotatable seal rings having abutting, lapped surfaces, one of said seal rings being rotatable with the pump shaft, means keying the other of said seal rings to said housing flange to prevent its rotation, one of said seal rings being movable relative to the shaft, means biasing said seal rings into sealing contact, and a rigid, symmetrical back-up ring interposed between one of said seal rings and said end plate, the latter seal ring abutting said back-up ring along lapped radially disposed surfaces, and said end plate abutting said back-up ring, whereby upon thermal expansion of the seal assembly the back-up ring will uniformly expand due to its symmetry and preserve a radially disposed surfaces to the seal ring which abuts it.

2. A seal assembly as defined in claim 1 wherein said housing flange is provided with an annular shoulder disposed in opposed spaced relation to said end plate, said back-up ring having a portion disposed in the space between said shoulder and said end plate, with a compressible gasket interposed between said shoulder and the contiguous portion of said back-up ring.

3. A seal assembly as defined in claim 1, wherein the innermost portion of said back-up ring is radially spaced from said shaft to thereby define between the said latter seal ring and end plate a quenching fluid chamber and said housing flange is provided with inlet and outlet ports communicating with said quenching fluid chamber.

4. A seal assembly as defined in claim 3, wherein said housing flange is provided with a counter fluid inlet port communicating with said seal chamber at a point between the plane of abutment of the seal rings and the back-up ring to produce a back flow of the fluid being pumped.

5. A shaft seal comprising: a housing having a shaft opening, a shaft rotatable in said opening, and sealing means for preventing the passage of pressure fluid through said opening along said shaft, said sealing means including a rigid housing flange secured to said housing and disposed about said shaft in spaced relation thereto, said housing flange having a part thereon extending radially inwardly towards said shaft, relatively rotatable, mechanical seal rings disposed about said shaft and having abutting, lapped, radially extending mechanical sealing faces, means mounting one of said rings on said shaft for rotation therewith, means securing the other of said rings to said housing against rotation, a rigid back-up ring interposed between the non-rotatable ring and said housing flange part, said non-rotatable ring and said back-up ring having opposed radially extended abutting, lapped mechanical sealing surfaces, said back-up ring and said housing flange part having opposed radially extended faces holding said back-up ring against movement longitudinally of said shaft away from said rotatable ring, and means providing a seal between said back-up ring and said housing flange, whereby upon thermal expansion of the seal assembly the back-up ring will uniformly expand due to its symmetry and preserve a radially disposed surface to the seal ring which abuts it.

6. A shaft seal comprising: a housing having a shaft opening, a shaft rotatable in said opening, and sealing means for preventing the passage of pressure fluid through said opening along said shaft, said sealing means including a rigid housing flange secured to said housing and disposed about said shaft in spaced relation thereto, said housing flange having a part thereon extending radially inwardly towards said shaft, relatively rotatable mechanical seal rings disposed about said shaft and having abutting, lapped, radially extending mechanical sealing faces, means mounting one of said rings on said shaft for rotation therewith, means securing the other of said rings to said housing against rotation, means for preventing deformation of said non-rotatable ring including a rigid back-up ring interposed between the non-rotatable ring and said housing flange part, said non-rotatable ring and said back-up ring having opposed radially extended abutting, lapped mechanical sealing surfaces, means for holding said back-up ring against movement longitudinally of said shaft away from said rotatable ring including opposed coengageable radially extended faces on said back-up ring and said housing flange part, and means providing a seal between said back-up ring and said housing flange.

References Cited in the file of this patent

UNITED STATES PATENTS

| | | |
|---|---|---|
| 2,128,744 | Hornschuch | Aug. 30, 1938 |
| 2,362,436 | Stratford | Nov. 7, 1944 |
| 2,599,034 | Wilkinson | June 3, 1952 |
| 2,650,842 | Coopman | Sept. 1, 1953 |
| 2,701,154 | Dolhun | Feb. 1, 1955 |
| 2,797,940 | Michener | July 2, 1957 |

FOREIGN PATENTS

| | | |
|---|---|---|
| 499,879 | Germany | June 14, 1930 |
| 628,974 | Great Britain | Sept. 8, 1949 |
| 643,545 | Great Britain | Sept. 20, 1950 |
| 653,939 | Great Britain | May 30, 1951 |